Sept. 24, 1929.  E. A. JOHNSTON  1,729,073
POWER DRIVE HARROW ATTACHMENT
Filed Sept. 23, 1927   2 Sheets-Sheet 1
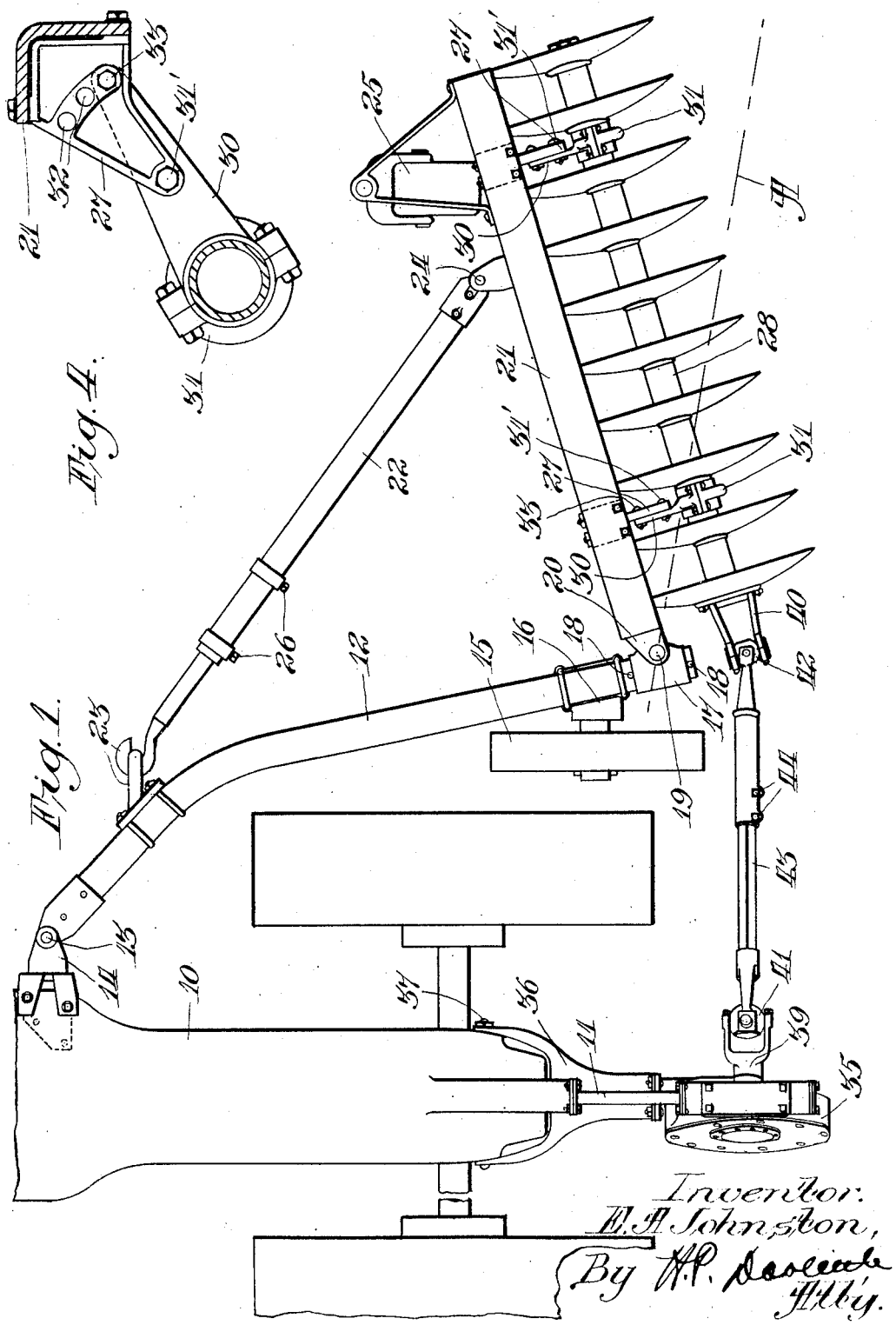
Inventor.
E. A. Johnston,
By
Atty.

Sept. 24, 1929.  E. A. JOHNSTON  1,729,073
POWER DRIVE HARROW ATTACHMENT
Filed Sept. 23, 1927    2 Sheets-Sheet 2
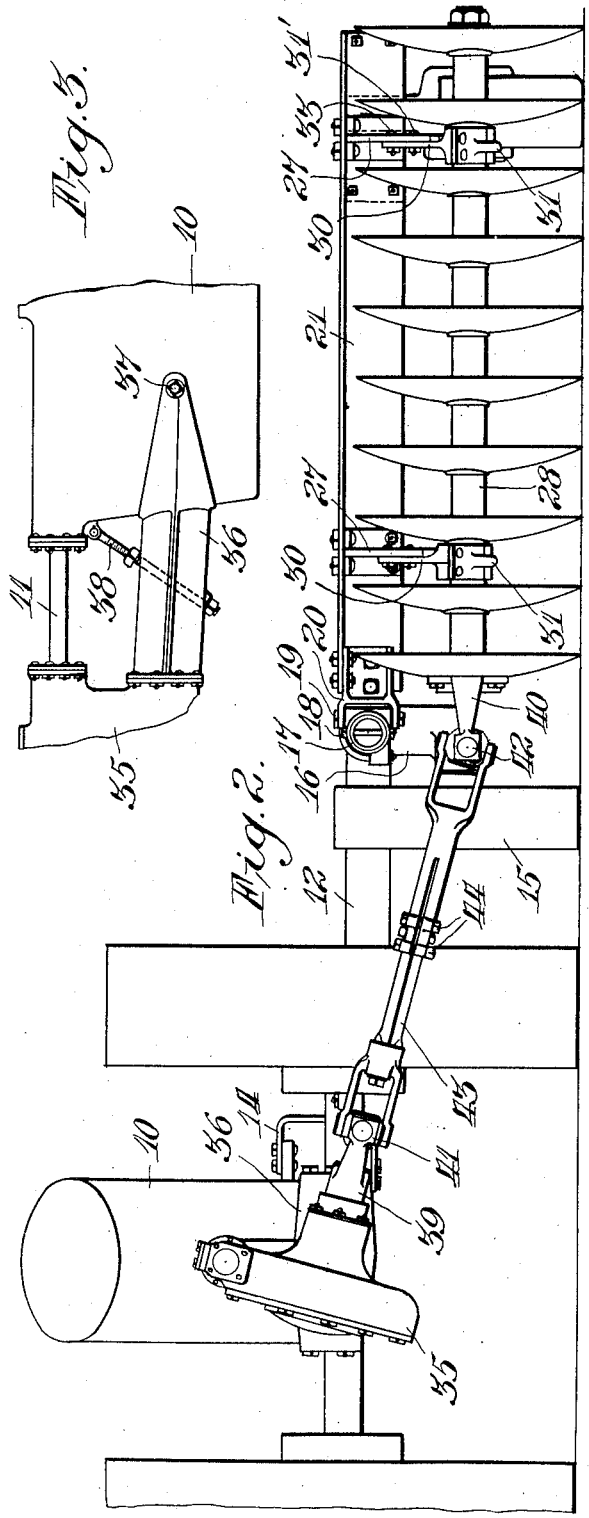
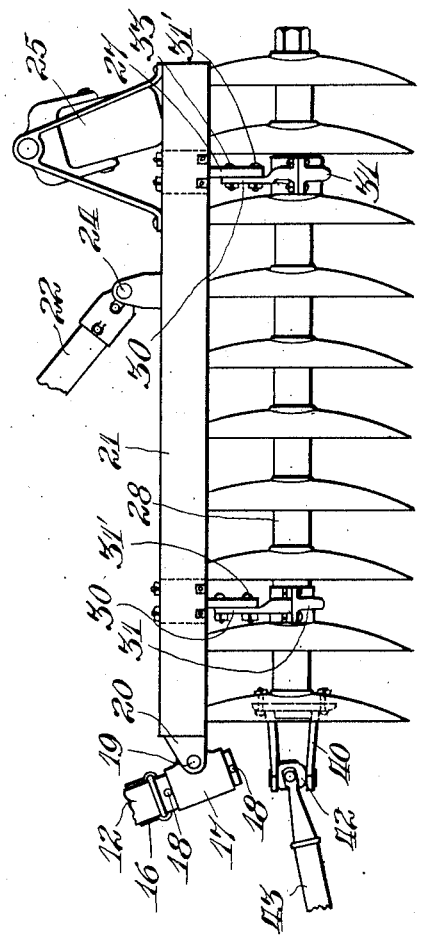
Inventor.
E. A. Johnston,
By his Atty.

Patented Sept. 24, 1929

1,729,073

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

POWER-DRIVE HARROW ATTACHMENT

Application filed September 23, 1927. Serial No. 221,593.

The present invention relates to improvements in power driven tillage tools and particularly an attachment of that character capable of being applied to standard types of tractors.

The main object of the invention is to provide a rotary ground working implement which will be mounted in lateral, or offset, relation to a tractor in a manner to adapt it more especially for orchard cultivation. A further object is to provide freely floating supports for such a tool that will permit power drive connections to be employed without interfering with independent vertical movement of the tool and with adjustments of the tool to different angular positions with respect to the tractor carrying it. It is also an object of the invention to so drive the rotary tool as to cause its rotation to assist its propulsion and counteract side draft on the tractor. These, and other minor objects and advantages, which will become apparent from the following description, are obtained by employment of the novel construction and combination of parts, or equivalents thereof, hereinafter more particularly described, and illustrated in the accompanying drawings, wherein:

Figure 1 is a plan view of a driven disk gang attachment embodying the invention and shown in position on a tractor;

Figure 2 is a rear elevation of the structure shown in Figure 1;

Figure 3 is a detail side view of the supporting means for the drive gear housing;

Figure 4 is an enlarged detail view of the adjustable hangers for the disk gang; and Figure 5 is a plan view of the disk gang when in reversed position to that of Figure 1.

The invention, as illustrated in one of its preferred embodiments, comprises in the combination a tractor 10. That shown is of the type having a central rearwardly projecting power take-off shaft at 11. The implement which is shown as connected to the tractor comprises a main supporting or draft bar 12 located at one side of the tractor and having its forward end pivoted on a vertical pivot at 13 to a swivel bracket 14 secured to the forward end of the tractor body at one side. Bar 12 extends laterally and rearwardly from the tractor to a point outside and a little behind the traction wheel on that side where it is supported on a wheel 15 having a spindle secured to a fixed bracket 16 depending from bar 12. The rear end of bar 12 has journaled on it, a sleeve 17 held in position by suitable stops such as pins or bolts 18. Sleeve 17 carries a vertical pivot pin 19 on which the arms of a pivot bracket 20 on the inner end of an outwardly extended frame member 21 are mounted. The member 21 is also connected to bar 12 by a diagonal draft bar 22 which is loosely connected to the forward end of bar 12 as by the hook and eye joint 23, and to the outer end of member 21 by a vertical pivot connection 24. The outer end of bar 21 is carried on a caster roller 25. The draft bar 22 is adjustable as to length and is preferably composed of telescopically related sections which are fixed at desired adjustment by suitable clamping means, such as set screws 26. The frame member 21 carries a pair of rearwardly and downwardly extending coupling arms 27 (Figure 4). To these arms there is detachably and adjustably secured a disk gang 28. The connections are preferably effected through arms or standards 30, which may be formed as extensions on bearing boxes 31 in which the shaft of the disk gang is journaled. The arms 30 overlap the arms 27, as seen in Figure 4, and are pivotally connected to the ends of arms 27 at 31'. The ends of arms 30 are formed with openings registering with an arcuate series of similar openings 32 in the bases of arms 27, and a bolt 33 serves to fix the overlapped arms at desired adjustment, thus providing for adjustment of the disk gang relatively to the frame member 21.

The disk gang 28 is preferably rotated in a forward direction during operation, and for transmission of power thereto there is provided a gear case or housing 35 at the rear of the tractor, which is secured thereto by a supporting casting 36 which may be pivoted on the tractor at 37 and fixed in position by an adjustable hanger bolt 38 (Figure 3). The upper portion of the housing 35 is in alignment with and receives the power take-off shaft 11 which drives suitable reduction gearing within the housing and connected to the drive shaft 39 which projects in a downwardly inclined direction from one side of the housing and towards the inner end of the disk gang. At said end, the end disk has secured to it an axially projecting drive bracket 40 constituting, in effect, an extension of the disk gang shaft. This bracket is readily detachable and is designed to be secured to either end of the gang for a purpose to be explained. Drive shaft 39 and drive bracket 40 are connected through universal joints 41 and 42 to an extensible intermediate drive shaft 43 formed of telescoping sections, the inner one of which may be polygonal, as shown, and which are secured at desired adjustment by suitable clamping means, as at 44.

With construction such as above described, the frame structure comprising bars 12, 21 and 22 carrying the disk gang 28 may float freely on its connections to the tractor, and the members 21 and 22, together with the disk gang, are further capable of vertical movement about the points of connection to bar 12 at 23 and 17 and on the drive shaft joint at 42, all of which are approximately in alignment. This flexible structure permits the tool gang to follow irregularities in the ground surface independently of the tractor and without causing interference with the drive transmission. For transport, the gang may be raised to vertical position about aligned pivots 23, 17 and 42. By adjustment of draft member 22, the working angle of the gang may be varied to suit conditions. It is also possible to reverse the disk gang and, by extension of bar 22, adjust the gang for in-throw substantially on the line A of Figure 1. When so reversed, the gang and associated connections will appear as in Figure 5.

Accordingly there has been devised an offset driven implement attachment for tractors characterized as operable substantially without creation of side draft, which accommodates itself to uneven ground surfaces without affecting its drive, and which is capable of a wide range of adjustments in working positions. While the structure exemplifies a preferred form of the invention, it is capable of embodiment in other forms within the scope of the following claims.

What is claimed is:

1. The combination of a tractor, a floating draft member connected to the tractor at a forward point and extending outwardly and rearwardly at one side of the tractor, a frame extending outwardly from the rear end of said draft member and pivotally connected thereto, means for angularly adjusting the frame in a horizontal plane, ground engaging supporting means for said floating draft member, and a gang of rotary disks mounted on said frame.

2. The combination of a tractor, a rotary tillage implement gang extending outwardly from one side of the tractor, flexible connecting means between the tractor and the gang comprising a frame on which the gang is mounted, a main supporting member connected to a forward point on the tractor and extending rearwardly at the outer side of one of the rear tractor wheels, a pivotal connection between the inner end of the gang frame and the supporting member, and adjustable connecting means between the gang frame and the supporting member for maintaining the gang frame in fixed horizontal angular relation to the supporting member.

3. The combination of a tractor, a rotary tillage implement gang extending outwardly from one side of the tractor, flexible connecting means between the tractor and the gang comprising a frame on which the gang is mounted, a main supporting member connected to a forward point on the tractor and extending rearwardly at the outer side of one of the rear tractor wheels, a universal joint connection between the inner end of the gang frame and the supporting member, and means for maintaining the gang frame in fixed horizontal angular relation to the supporting member comprising a diagonal member adjustably connecting the outer end of the gang frame with the supporting member.

4. The combination with a tractor having rear traction wheels and a power take-off shaft projecting rearwardly between said wheels, of a laterally and rearwardly extending draft member connected at its forward end to the tractor in advance of the traction wheels with its rear portion at the outer side of one wheel, a gauge wheel on the rear portion of said member, a frame member pivoted on the end of said draft member for vertical movement and extending outwardly therefrom, a rotary tillage implement gang carried on said frame member, and a flexible driving connection between the power take-off and the gang.

5. The combination with a tractor having rear traction wheels and a power take-off shaft projecting rearwardly between said wheels, of a laterally and rearwardly extending draft member connected at its forward end to the tractor in advance of the traction wheels with its rear portion at the outer side of one wheel, a gauge wheel on the rear portion of said member, a frame member extending outwardly from the rear end of said member and pivoted thereto for vertical and horizontal movement, a rotary tillage implement gang carried by said frame member, means for holding said frame member and gang in horizontal angular adjustment about its connection to the draft member, and a drive shaft connected by a universal joint to one end of the gang and comprising telescopically related sections one of which is connected to the power take-off.

6. An offset trailing attachment for tractors having a rear end power take-off comprising pivotally connected divergent draft members including coupling means adapted for connection to the side of a tractor at a forward point thereon, a gang of rotary tillage tools pivotally connected to said members at the spread ends thereof, and a flexible driving shaft connected to the gang and having means for connection to the power take-off of the tractor.

7. In a power driven implement attachment for tractors having a rear end power take-off, the combination of an elongated frame member, spaced coupling arms projecting laterally therefrom, means for connecting said member to a tractor in laterally offset angular relation thereto, a gang of concavo-convex disks, coupling arms on the gang interchangeably connectible with the arms on the frame in reversed positions of the disk gang, and a drive shaft for the gang having means for connection to the power take-off and means selectively attachable to either end disk of the gang.

8. An orchard disk harrow attachment for tractors, the combination of a frame, a gang of disks having a shaft journaled in bearings on the frame, and means for connecting the frame to the side of a tractor with the disk gang as a whole offset laterally at one side of the tractor comprising a main draft member extending forwardly and laterally away from the inner end of the frame and having means on its forward end for pivotal connection to a tractor and an extensible draft member connecting the outer end of the frame with the forward end of the main draft member.

In testimony whereof I affix my signature.

EDWARD A. JOHNSTON.